United States Patent [19]

Melcher

[11] Patent Number: 5,773,376

[45] Date of Patent: Jun. 30, 1998

[54] PROCESS FOR PRODUCING A MAINLY INORGANIC FOAM, AND THUS PRODUCED MASS OR MOULDED PART

[76] Inventor: Gerhard Melcher, Waldgasse 40/24, A-1100 Wien 10, Austria

[21] Appl. No.: 676,221

[22] PCT Filed: Jan. 18, 1995

[86] PCT No.: PCT/AT95/00008

§ 371 Date: Sep. 24, 1996

§ 102(e) Date: Sep. 24, 1996

[87] PCT Pub. No.: WO95/09939

PCT Pub. Date: Jul. 27, 1995

[30] Foreign Application Priority Data

Jan. 21, 1994 [AT] Austria ................ A 110/94

[51] Int. Cl.⁶ .......................... C04B 28/34; C04B 38/02; C04B 38/10; B32B 3/26
[52] U.S. Cl. .......................... 501/84; 106/601; 252/62; 428/312.2
[58] Field of Search ............ 501/84, 124; 106/601; 252/62; 428/312.2

[56] References Cited

U.S. PATENT DOCUMENTS

| | | | |
|---|---|---|---|
| Re. 33,366 | 10/1990 | Barrall | 501/84 |
| 3,141,857 | 7/1964 | Sommer | 501/84 |
| 3,150,988 | 9/1964 | Dess et al. | 501/84 |
| 3,598,618 | 8/1971 | Fuji et al. | 501/84 |
| 4,124,365 | 11/1978 | Williams et al. | 501/84 |
| 4,171,985 | 10/1979 | Motoki et al. | 501/84 |
| 4,207,113 | 6/1980 | Yoshino et al. | 501/84 |
| 4,226,908 | 10/1980 | Yoshino et al. | 428/310 |
| 4,724,242 | 2/1988 | Vassileff | 106/779 |

Primary Examiner—Diana Dudash
Attorney, Agent, or Firm—Bacon & Thomas

[57] ABSTRACT

A mainly inorganic foam is produced by foaming a filler-containing, preferably primary aqueous polyvalent metal phosphate solution having a defined viscosity, then by neutralising and cross-linking most of the secondary phosphoric acid protons by polyvalent cations. As foaming agents preferably carbonates are added that rapidly decompose in the acid metal phosphate solution. Cross-linking is ensured by hardening accelerators adapted to the foaming agent, for example polyvalent metal oxides. Accurately describable foaming characteristics are thus obtained which may be defined, as for a polyurethane foam, as starting time, rising time and setting time.

20 Claims, 1 Drawing Sheet

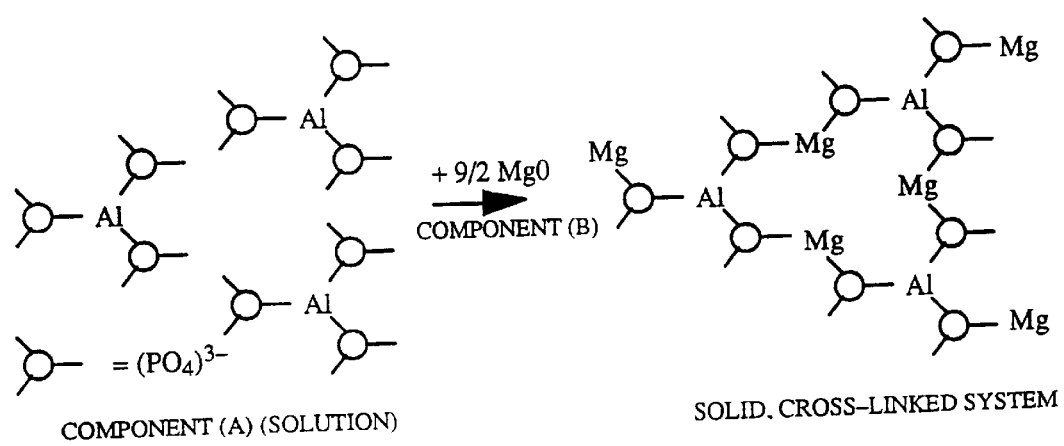

PROCESS FOR PRODUCING A MAINLY INORGANIC FOAM, AND THUS PRODUCED MASS OR MOULDED PART

The present invention relates to a process for producing an inorganic solid foamed mass or molded part with a density of preferably more than 0.15 g/cm$^3$ which comprises mixing a first component, which comprises a phosphate solution and a hardener, with a second component comprising a foaming agent. The two components may be mixed themselves, and may contain additional additives. The invention includes not only the process of mixing, but also the resulting foamed products.

For the thermal insulation, for example of furnaces, temperature resistant light bricks, fibrous materials or inorganic foams are used. The disadvantage of the light bricks is their brittleness. The weakness of the fibermats is, besides the common environmental problems of fibers, their low stability, which can lead in the case of certain applications to a disintegration of the mats. The inorganic foams, however, are mostly based on water glass or glass and often possess due to the melting point of glass, relatively low application temperatures. It is the aim of this invention to describe an environmentally sound, multi-purpose applicable insulating material also useable for high temperatures.

Such foams are known amongst others from U.S. Pat. No. 3,148,996, where to an aqueous acidic solution of a metal phosphate finely powdered calcium silicate (wollastonite) is added and where after five minutes of ripening time, before hardening of the mass occurs, through stirring of solid calcium carbonate as foaming agent into the mass a foam is produced.

In U.S. Pat. No. 3,330,675 instead of calcium silicate a basic compound is used. To an aluminum phosphate solution equivalent amounts of a basic compound and a gas forming as foaming agent acting compound are added.

In DOS 27 56 198 on the basis of metal phosphate and powdered calcium carbonate a foam with a specific weight below 0.15 g/cm$^3$ is described Here an equivalent ratio of the metal valences to he protons of the phosphate groups of 0.65 to 0.95 is used and mainly highly viscous, already precured metal phosphate solutions are used, in which the solid carbonate is to be stirred.

A continuous process for the production of a foam with low specific weight, which is filled into moulds, is described in DD 205 429. Here an acidified metal phosphate solution, which can contain fillers, a suspension of a bivalent metal carbonate, is mixed continuously in a two component spraying gun and the mass is blown with a gaseous pressure medium into moulds or spaces to be filled.

In none of the mentioned patents a foaming mass on the basis of phosphates with adjustable hardening characteristics or with as far as possible independently adjustable working parameters like starting time, rising time and setting time, etc. as defineable for a polyurethane foam, is described. The invention, as described in the claims, particularly points out the subject matter how to overcome these disadvantages and to describe a foaming and solidifying inorganic mass, in which as decisive advantage the density can be adjusted in wide ranges and the working parameters of above can be adjusted largely possible independently from one another.

Important for the homogeneity of the foam is in the case of fast reacting components, the rapidly obtainable regularity in the distribution of hardener and foaming agent in the acidic component. The addition of these compounds can usually occur in two ways; as powdered solid matter or as suspension in water. A solution in water is only possible in the case of alkali- or ammonium carbonates or hydrocarbonates.

The addition of solid matter, to be stirred in causes, (especially in the case of large amounts and possible mixing times of only some seconds) due to the reactions on the surfaces of the solid matter, that during the mixing process locally different concentrations arise and thus different cross-linking reactions occur. A fast, homogeneous, strongly stoichiometric reaction, is necessary for a fast foam hardening, and is especially necessary for the entire foam amount also in the case of larger amounts and can hardly be obtained in a discontinuous mixing processes. It is therefore recommended especially in the case of larger foam amounts to use continuous mixing processes. It will therefore be favourable to work with suspensions, with in water dispersed finely distributed powders, as they allow a homogenous and fast mixing into the second acidic component. However, it must be mentioned that this process cannot be used in the case of water reacting oxides, for example calcium oxide. In the case of, for example for large amounts a continuous mixing of the solid matter powder in the acidic component with the help of a screw press into a mixing chamber is necessary.

If only carbonates are used as hardener and foaming agent obviously a separate adjustment of hardening speed and foaming power cannot be obtained. This is according to this invention only possible, if during the hardening process practically homogenously and simultaneously both foaming agent and hardener with exactly defined properties in exact doses already finely dispersed are mixed into an acidic phosphate solution with defined viscosity and defined acid content.

Experiments have shown that it is advantageous to start with the three basic phosphoric acid where the primary proton is already neutralized by a polyvalent cation and mainly to neutralize the second secondary proton during the hardening/foaming step. In a third step during the storage of the foam by a slow reaction with a basic filler the tertiary hydrogen atom can be neutralized. It was found that an equimolar addition of acid and base in one step is not favourable.

As aqueous phosphate solutions preferably commercial 50% monoaluminum phosphate solutions or solutions of metal oxides in for example 75% phosphoric acid can be used, where 0.8 to 1.75 protons of the threebasic phosphoric acid are neutralized by the cations and this solution can contain as polyvalent cations aluminum, magnesium, calcium, barium, zinc, nickel, cobalt and manganese.

As hardener, substances can be used, which allow depending on their reactivity, particle size, etc, that an acidic solution of a metal phosphate is hardened within seconds to some minutes by sterical crosslinking. Furthermore, the reactivity of the individual components has to be adjusted to the amount which is necessary for the crosslinking (for the partly or complete neutralization of the phosphoric acid). This leads to a situation where similar characteristics, as for a polyurethane foam, can be adjusted (for example: starting time: 5 s, rising time: 1.5 min, setting time: 2 min, pressure-proof time: 3 min).

The importance of the selection of the hardener is insofar easily recognizable as for example there exist many kinds of different magnesium oxides, which differ decisively in their properties depending on their way of production. So there exist precipitated or natural oxides, which can be dried at different temperatures or burned and ground to different particle sizes. Thus especially their reactivity, especially their solubility in acid, is decisively influenced. It is therefore recommended to test and to select the raw material before its use under its specific working conditions.

As hardener certain metal oxides ZnO, MgO, CaO, BaO, SrO, FeO, $Fe_2O_3$, Zirkonium oxid or hydroxides, like $Ca(OH)_2$, $Mg(OH)_2$, $Zn(OH)_2$, iron hydroxide, $Mn(OH)_2$, $Al(OH)_3$, etc., or salts of weak acids can be used. Undoubtedly also carbonates of polyvalent cations react as hardener, even if their main action is as foaming agent. Such carbonate powders, which release at the same time with the development of carbon dioxide polyvalent cations are usually carbonates of calcium and magnesium, or carbonates of zinc, strontium, barium, iron, nickel, etc. Basic carbonates, for example of zinc, magnesium, iron, manganese, nickel, copper act analoguously.

Also other hardeners, like for example naturally occuring oxidic, basic rock powder, which can contain for example also carbonates, or artificially produced mixed odoxides or silicates, like for instance hydraulically setting cements, with defined hardening characteristics can be used. It is especially favourable, if a fast within 10 s to 60 min reacting hardener is used in an amount, where it neutralizes mainly the secondary phosphate groups.

The effect of the hardeners shows the cross-linking illustration of drawing 1. It explains that in the foam favourably nearly all secondary hydrogen atoms (that are ⅔ of the existing protons of the phosphoric acid) are to be neutralized by polyvalent cations for the formation of optimal cross-linked structures. Advantages of a breaking down of the crosslinking steps into exact steps can be easily seen, as the single protons of the phosphoric acid differ strongly in their reactivities and azidities. So the dissociation constants of the phosphoric acid are $K_1=1.1 \cdot 10^{-2}$, $K_2=1.2 \cdot 10^{-7}$, $K_3=1.8 \cdot 10^{-12}$. This shows that after the neutralization of the primary hydrogen atoms the secondary phosphate group will be neutralized by the reaction with weak bases.

Surprisingly it was found that foams with decisively better properties occur, if a seemingly elastic cross-linked structure is formed where the primary and secondary hydrogen atoms of the phosphoric acid are neutralized and a relatively great percentage of filler material is included, so that the content of the binder (phosphate content) is between 10 to 40 percent by weight, and not when all three acidic phosphate valences are cross-linked in an as it seems relatively rigid form.

The tertiary acid group of the phosphate can be neutralized by additional basic slowly reacting components, for example especially environmentally friendly in form of grinded basic rocks, which can due to the application together with the foaming agent also contain carbonates.

As foaming agents, all under working conditions gas-liberating or gas-forming substances include for example metals, which develop hydrogen in acidic medium, or other for example in U.S. Pat. No. 3,330,675 mentioned compounds can be used. The period of the gas forming process shall be between 3 s to 10 min, preferably between 5 s to 5 min and coordinated with the setting process, which usually is between 10 s to 60 min, preferably 20 s to 10 min. Especially favourable is the use of carbonates, whereby many types of carbonates, for example of zinc, calcium, strontium, barium, magnesium, iron, nickel, etc. or also of basic carbonates, for example of zinc, magnesium, iron, manganese, nickel, copper, etc. are possible. Also alkali carbonates and ammonium carbonate or their hydrogen carbonates can be used. These foaming agents can be used alone or in combination with one another, for example as solid matter, as suspension, or as solution (using water soluble carbonates).

The amount of protons with a corresponding acidity, especially the content on secondary protons of the phosphoric acid, in comparison to the used metal carbonate and metal oxide is important. In addition to the acidic metal phosphate it is possible to add acid, for example phosphoric acid or sulfuric acid, but the amount of acid has to be considered depending on the pK values of their protons. The gas formation and its speed is depending in the case of the carbonates on the pH value, which is defined in the hardening/foaming process by the reactivity and amount of the hardener in comparison to the amount of the acid. Therefore a defined acid capacity and a defined starting pH value is of importance. The amount of acid which has to be neutralized is also of importance for the exothermic reaction of the process.

In the here made examinations it was found that it is especially decisive to obtain the given characteristics of the foam to neutralize the protons of the phosphoric acid stepwise, thus neutralizing relatively exactly the secondary protons of the phosphoric acid to obtain a solid foam. It is often favourable, due to the buffer equilibrium which is characteristic for the phosphoric acid, and which is shifted nearly completely in the case of complete neutralization to one (basic) component, to remain a little bit under the calculated equivalent value necessary for the neutralization of the secondary phosphate group, to avoid a segregation of the hardener and of the not reacted carbonate.

To obtain defined starting conditions it is recommendable to adjust the viscosity of the starting mixtures (component A) (for example with a viscosity at room temperature in the range of 2000 mPa.s to 80000 mPa.s, preferably between 6500 mPa.s to 60 000 mPa.s) and for example also of component (B) in a favourable way by the addition of fillers, where according to the type of filler a filler content between 30 to 200 percent by weight referring to the liquid content (e.g. water or phosphate solution) is favourable. The starting viscosity is decisive for the structure of the foam. A highly viscous liquid needs large amounts of gas (pressure) and tends to produce hard foam, a liquid with a very low viscosity will produce under the same conditions a lighter foam, which has to be solidified, where these foams have a strong tendency to form large gas bubbles, so that such foams without the addition of in acidic medium active wetting/foam stabilising agents collapse relatively fast in the air.

Furthermore slowly reacting substances, which can be preferrably contained in a filler, can be added to one or both components, so that the remaining acidic phosphate groups can be neutralized in a slow ripening process after the first fast neutralisation process.

In the following it was found that it is possible for such foams with the help of special reactivities and kinds of fillers, where especially fillers in the form of platelets (preferably grinded mica or slate, especially with a particle size below $100\mu$ or $45\mu$ but also of fillers up to a particle size up to 2 mm, also preferably in form of platelets) are found to be especially favourable, to obtain for the formation of foam certain favourable rheologic properties and in the end also good foam stability. Usually fillers with the preferred particle size below $200\mu$ or $100\mu$, especially $45\mu$ are used, as for example Bauxite, quartz, aluminium oxide, feldspar, wollastonite, mullite or burned magnesite. Hydrophobicized cellular materials, as for example hydrophobicized perlit, which have usually much higher particle diameters, are excluded as fillers.

Through kind and amount of the filler the problem of crack resistance during the drying process of larger surfaces can be influenced. In this case the use of fibers, for example of cellulosic fibers or also other organic and/or inorganic fine fibers, like alumo silicate fibers or glass fibers, or wollastonite, can be considered. It is also possible to use fabrics and/or other types of reinforcing- or strengthening materials, as for example glass or wire nettings.

A water content by weight between 15% to 45% is important for viscosity and stability of the obtained foam. Too much water prevents the hardening of the mixture and the foam collapses. The maximum amounts of water depend on the nature of the filler and also of the hardener (for example if very fine hardener powders with great surfaces are used). The dependency on the used system components is best seen by comparing example 1 with example 4. In example 1 30% water content in the entire system give a stable foam (100 g with 25% water in the A-component (25 g) and additional 33 g B-component with about 45% water (14.8 g)=133 g mixture with 39.8 g water=29.96%). In the case of example 4 24% of water give no stable foam (100 g with 21.2% water in the A-component (21.2 g) and additional 34 g B-component with about 31.25% water (10.6 g)=134 g mixture with 31.8 g of water=23.73%). In this example the foam becomes stable with 17.2% of water. In some cases it might be favourable to add liquifying agents for the reduction of the viscosity and/or water content.

It was found that dependening on the type of the filler used and especially of the foam density to be obtained that the addition of in acidic medium active wetting agents and/or foam stabilising agents and/or thixotropic agents might be favourable.

Under special conditions it might be favourable to store the premixed components as dry or in water suspended intermediate product and keep them ready for a later use, where the mixing ratios have to be adjusted in such a way that mainly the secondary protons of the phosphoric acid are neutralized.

Process Parameters

The speed of hardening can be adjusted by selecting the hardening substances, whether oxides, hydroxides, salts or a mixture of different basic substances are used. The speed of hardening is to be seen in connection with the necessary starting- or mixing time and the speed of mixing, and the parallel occurring rising time. These terms are best described with the for polyurethane used usual characteristics for a foaming process in the laboratory (G. W. Becker/D. Braun in Kunststoffhandbuch 7 Polyurethan p.353 ISBN 3-446-136142) described and defined:

starting time (including mixing time): beginning of mixing up to the beginning of the foaming (with a mixing time favourably in the range of 0.1 s or 2 s to 60 s)

rising time: beginning of mixing up to the end of the rising process (foaming process)

setting time: beginning of mixing till a tack-free surface of the foam is obtained In addition it proved favourable and brought further clarity to define a pressure-proof time in which the foam is hardened to such an extent that it will be stable against a low pressure with the fingertip. This time makes sense especially in the case of long setting times, where only by a drying process on the air the surface of the foam becomes tack-free without curing.

As can be easily seen, these parameters will be strongly influenced not only by the nature of the hardener, its amount and reactivity depending on the amount of free protons and the existing acidity, but also by the course of the viscosity, which depends on the content of water and the initial viscosity.

If one adjusts the initial viscosity by a defined water content not by the filler, but as is the case with the at the beginning mentioned patents through the neutralization of the phosphoric acid with polyvalent cations, one changes due to the increase of the viscosity also the amount of filler which can be added. However, as generally known, the filler content is (in connection with the content of binder) an important factor for the physical end properties of a product and should therefore be an as far as possible freely adjustable parameter.

The drying of the foam can occur as long-term process in a resting phase at room temperature or at elevated temperature though the influence of warm air and/or radiation heat, for example in a stove. The removal of the water with micro wave or high frequency is especially favourable in the case of larger foam thicknesses.

Foam Properties

An important point is the mechanical strength which is determined to a great extent through the density. It was found that one usually obtains in the case of densities above 0.15 $g/cm^3$ enough pressure strength for daily use, for example for materials for fire prevention. Especially in the case of large-sized applications the homogeneity of the foam is of importance. Bending strength and crack resistance can be improved by the addition of fibers (for example of cellulose fibers or mineral fibers) or by the addition of fillers in form of platelets or rods (wollastonite).

The temperature resistance is decisively influenced by the nature of the filler.

The heat conductivity is essentially a function of the density, where an open or closed porous structure might also influence the heat conductivity. The values of such foams are depending on the density (0.1–0.9 $g/cm^3$) in the range of 0.05–0.17 W/m° K.

A fast hardening speed that is the fast hardening of the foam with corresponding mechanical properties is decisive for certain applications, for example if the mixture is sprayed, to avoid a flow of the foam if applied to vertical surfaces.

The water resistance can be influenced by a series of factors. It will be improved by the slow postreaction and hardening during days or by heating and the thus obtained drying of the foam.

It is furthermore possible to add hydrophobic substances or to use specific hardeners, which also improve the water resistance.

The drying temperature of the foam is also an important factor for it water resistance. It is known that for example aluminum phosphate remains completely water soluble up to a temperature of 140° C. Only at 400° C. the conversion into a water insoluble form is completed.

Besides a high temperature resistance isolating materials often should also have properties preventing corrosion. They are given to a large extent due to the phosphatising properties of the foam mixtures.

EXAMPLES

In the following examples the invention will be explained. Component A usually consists of water (15 to 60% by weight), phosphate salts (for example mono aluminium phosphate (10 to 40% by weight), free acid (0 to 8% by weight), filler (cubic, in form of platelets, rods or fibers) (3 to 66% by weight), and occasionally organic additives and auxiliary agents (0 to 10 (5) % by weight) as remaining amount.

Component B is used as powder, as paste or as aqueous suspension. It consists therefore occasionally of water (0 to 80% by weight, preferably 30 to 80% by weight), hardener (0 to 95% by weight), foaming agent (hardening or not hardening) (5 to 100% by weight), filler (cubic, in form of platelets, rods or fibers) (0 to 70% by weight), and occasionally organic additives and auxiliary agents (0 to 10 (5) % by weight) as remaining amount.

To both components further compounds, like reinforcing substances (for example fibers) in amounts between 0 to 20% by weight can be added if necessary.

The constituents of the components A and B will be mixed homogenously as components. The components are afterwards in exactly adjusted mixing ratios fast and homogenously mixed to a hardening foaming mass. The foaming mass can be poured into moulds or be applied on surfaces.

The mixing ratio of the components A:B can according to the amounts of raw materials used ususally be in the ranges of A:B=1 part: 0.05 (or 0.1) to 3 (or 2) parts. According to this invention the equivalent ratios of the reacting constituents are considered in such a way that mainly the secondary protons of the phosphate groups are neutralized.

Used raw materials:
As filler:
a) black rock powder (Type I) ($\leq 200\mu$, 93% below $90\mu$) 38% by weight of mica, 18% by weight of chlorite, 19% by weight of quartz, 21% by weight of albite, 4% by weight of calcite (in form of platelets)
b) white rock powder (Type II) ($\leq 200\mu$) 34% by weight of quartz, 33% by weight of chlorite and 33% by weight of mica
c) mica powder ($\leq 30\mu$),
d) quartz powder ($\leq 12\mu$),
e) wollastonite (Nyad G von Nyco Minerals, Inc.)

As hardener:
calcium oxide, calcium hydroxide, magnesium oxide (Type I, ($\leq 150\mu$)), magnesium oxide (Type II, extralight), magnesium oxide (Type III, Maglite), magnesium hydroxide, zinc oxide (zinc white Redseal), Portland cement 275

As phospate solution:
Fabutit 705 (50% aqueous solution of $Al(H_2PO_4)_3$ (Fa. Budenheim), 75% phosphoric acid, As foaming agent:
basic magnesium carbonate: $[Mg(MgCO_3)_4](OH_2).5H_2O$ (Fa. Merck), Omyacarb 15 ($\leq 100\mu$), Omyacarb 40($\leq 200\mu$), Omyacarb 130 ($\leq 400\mu$) (Fa. Omya)

Example 1. Examination of the influence of the amount of the hardener with the help of a continuous dosing and mixing machine Component (A): 100 parts of 50% solution of monoaluminumphosphate and 100 parts of the rock powder (Type I) with a viscosity measured according to Brookfield of 18 000 mPa.s.

Component (B): 90 parts of MgO (Type I)+18 parts of basic $MgCO_3$+80 parts of rock powder (Type I) in 155 parts of water.

Both components were continuously mixed with one another in the mixing ratios of the table and the following foam values by filling the mixtures into paper cubs obtained: (The equivalent for the neutralization of the secondary proton is 16.5 parts of component (B) to 100 parts of (A)).

| mixing ratio (B):(A) | starting time | rising time | setting time | pressure-proof time | density g/cm$^3$ | segregation of the hardener |
|---|---|---|---|---|---|---|
| 8 T:100 T | 6 s | 58 s | 3 min 15 s | remains wet | | no |
| 12 T:100 T | 5 s | 1 min 20 s | 3 min 30 s | remains wet | 0.56 | no |
| 14 T:100 T | 4 s | 1 min 20 s | 2 min 50 s | remains wet | 0.52 | no |
| 16.5 T:100 T | 4 s | 1 min 20 s | 1 min 40 s | 2'10 s | 0.40 | no |
| 18 T:100 T | 3.5 s | 48 s | 53 s | 1'10 s | 0.33 | yes |
| 21 T:100 T | 3 s | 32 s | 40 s | 45 s | 0.33 | yes |
| 33 T:100 T* | 3 s | 32 s | 40 s | 50 s | 0.45 | yes |

*(mixed by hand)

The obtained results show that the neutralization of the secondary phosphate group (occuring with 16.5 parts of component (B): 100 parts of component (A)) by the hardener is decisive for the stability of the foam. Below this molar ratio the foams remain wet during hours and will become hard only by drying on the air. During this time they have the tendency to collapse. Above this molar ratio the additional hardener remains, as can be shown by its segregation, mainly unreacted.

Example 2. Influence of the nature of the hardener and of the foaming agent

Component (A): 100 parts 50% by weight of a solution of monoaluminum phosphate and 100 parts of the rock powder (Type II)

Component (B) (according to the standard mixture of example 1): 90 parts of MgO (Type I) or a corresponding equivalent amount of other hardeners+18 parts of basic $MgCO_3$ or corresponding equivalent amounts of other carbonates+80 parts of rock powder (Type II) in 155 parts of water) In the case of the experiments h, n and o the (B)-component was added as powder, without addition of water.

Component (A) and component (B) are mixed in a beaker with the help of a fast running mixer in a mixing ratio of 100:16.5, which corresponds to a complete neutralization of the secondary proton of the phosphoric acid. As mixing time 10 seconds were necessary, to obtain sufficient homogenisation. (This led in the case of short starting times of the mixtures to a strong influence on the density (disintegration of the foam). Furthermore usually due to the 10seconds of mixing time the starting time can usually not be determined in the beaker.

| Component (B) Hardener/Carbonate | % water in the foam[1] | rising time | setting time | pressure-proof time | density g/cm$^3$ |
|---|---|---|---|---|---|
| a) MgO(I)/bas.MgCO$_3$ | 27.9% | 95 s | 2 min 35 s | 2 min 55 s | 0.45 |
| b) MgO(I)/bas.MgCO$_3$ | 28.7% | 90 s | 3 min 10 s | 3 min 50 s | 0.43 |
| c) MgO(I)/bas.MgCO$_3$ | 25.7% | 70 s | 1 min 23 s | 1 min 35 s | 0.56 |
| d) MgO(Maglite)/bas.MgCO$_3$ | 27.9% | 10 s | 5 min 40 s | — | 0.68 |
| e) MgO(extra light)/bas.MgCO$_3$ | 34.9% | 8 s | 8 s | 8 s | 1.30 |
| f) Mg(OH)$_2$/bas.MgCO$_3$ | 28.8% | 25 s | 42 s | 50 s | 0.87 |
| g) Ca(OH)$_2$/bas.MgCO$_3$ | 28.7% | 40 s | 2 min 10 s | 3 min 30 s | 1.29 |
| h) solid CaO/bas.MgCO$_3$ | 22.9% | 45 s | 1 min 5 s | ~7 min | 0.82 |
| difficult mixing under experimental conditions/inhomogeneous distribution | | | | | |
| i) MgO(I)/Omyacarb 15 | 27.9% | 100 s | 2 min 00 s | 2 min 30 s | 0.56 |
| k) MgO(I)/Omyacarb 40 | 27.9% | 60 s | 2 min 20 s | 3 min 40 s | 0.70 |
| l) MgO(I)/Omyacarb 130 | 27.9% | 80 s | 2 min 40 s | 2 min 50 s | 1.09 |
| m) MgO(I)/NH$_4$HCO$_3$ solution | 28.5% | —[3] | 2 min 50 s | 3 min 30 s | 1.00 |
| n) solid MgO(I)/NH$_4$HCO$_3$ | 22.9% | 85 s | 2 min | 3 min | 0.90 |
| o) solid MgO(I)/bas.MgCO$_3$ | 22.9% | —[4] | — | — | — |
| mixing under experimental conditions not possible | | | | | |

Remarks:
[1] according to the used hardener/carbonate-mixtures (especially depending on the fineness of the used raw materials) different amounts of water were necessary to obtain a homogenous distribution.
[2] In the case of mixture c) component (A) was made of 100 parts of phosphate solution and of 120 parts of filler, thus reducing the water content in the entire mixture.
[3] The aqueous solution of ammonium carbonate reacts so fast that the starting time and the rising time fall together. There is no time in the beaker for the mixing process.
[4] A fast homogenouss mixing of fine powdered solid basic magnesium carbonate was not possible under the given experimental conditions, as immediate lumpy aggregation occured and very inhomogenous mixtures were formed.

Results

These results show the importance of the nature of the hardener and the foaming agent for the foam density and foaming characteristics with a given A-component in a discontinuous mining process in a beaker. Furthermore can be seen, that the water content (whose maximum content depends on the single substances) is decisive for the setting time (till a tack-free surface of the foam is obtained), whereas too large amounts of water prevent the formation of a stable foam.

It is obvious from these experiments, that with a given (A) component starting time, rising time and setting time are influenced by a) kind and b) particle size (it determines their solubility speed) of hardener and foaming agent. Besides the general importance of the water content it is important for the setting time. An increase of the water content causes an increase of the setting time:

c):a):b)=25.7%:27.9%:28.7% water=1'23":2'35":3'10" setting time.

Example 3. Experiment with mica, as filler in the form of platelets, a solution of zinc phosphate, made from ZnO and 75% H$_3$PO$_4$, and ZnO/basic magnesium carbonate as hardener/foaming agent combination In 11.8 g 75% by weight of phosphoric acid are 3 g ZnO dissolved and 7 g powder of mica stirred in (component (A)). Into this mixture 3.6 g powder of mica with 2.9 g of ZnO and 0.5 g of basic magnesium carbonate as solid materials are stirred (component (B)). A fine foam of the density 0.30 g/cm$^3$ is formed, which needs about 30 minutes for hardening.

Results: Stability of the foam is very great, foam remains wet for a long time due to the slow hardening with ZnO (dissolves relatively slowly in the 75% by weight phosphoric acid), but it is very fine and stable due to the mica. For its dehydration about six hours of a drying process at elevated temperatures are recommendable.

Example 4. Experiment with cubic fillers (quartz powder) and cement/chalk as hardener/foaming agent combination
Component (A): 100 parts of monoaluminum phosphate solution are mixed with 120 parts of quartz powder S 600.

Furthermore a small amount of a wetting agent, which has to foam, in an acidic medium, was added.
Component (B): 5 parts of Omyacarb 15 and 25 parts of Portland cement 275.

Through fast mixing of the components in the mentioned mass ratios one obtains a solid foam with 17.2% water and a density of 0.85 g/cm$^3$. The starting time is 3 s, the rising time 70 s and the setting time 2 min 10 s.

Further addition of 25 parts of water and 25 parts of quartz powder to component (B) makes the foam soft and collapsing. This mixture has 23.7% water.

[100 g with 21.2% water in component (A) (21.2g) and additional 34 g component (B) with 31.25% water (10.6g) =134g mixture with 31.8 g water =23.7%].

Example 5. Example where the conmposition is employed as layer

A composition according to example 1 with the mixing ratio of the components (A):(B) =100:16.5, with 2% short cellulose fibers added, was employed in two steps to a clean and grease free iron sheet with the help of compressed air and a spraying gun in the thickness of 10 mm. The foam with the density 0.49 g/cm$^3$ had a very good adhesion on the iron sheet.

Example 6. Production of a light foam with the density below 0.10 g/cm$^3$ using calcium carbonate as hardener and foaming agent. The importance of the use of an in acidic medium foaming wetting agent and of the mixing conditions.

Component (A): 100 parts of monoaluminum phosphate, 90 parts of rock powder (Type I) and 10 parts of wollastonite; from case to case with or without wetting agent (as foam stabiliser).

Component (B): Suspensions of the mentioned types of chalk in identical parts by weight of water
 (B$_1$) Omyacarb 15 (medium particle size 13$\mu$, below 10$\mu$: about 45%)
 (B$_2$) Omyacarb 130 (medium particle size 160$\mu$, below 50$\mu$: 5%)
 (B$_3$) A mixture 1:1 of B$_1$ and B$_2$.

Experiment: Immediately after the production of component (A) 14 g of component (B) were added to 50 g of it and mixed intensively for 5 s in a 300 ml paper beaker with a fast running mixer under constant experimental conditions;

Results

| Comp. (A) mixed with: | (B$_1$) | (B$_2$) | (B$_3$) | (B$_1$),(B$_2$),(B$_3$) |
|---|---|---|---|---|
| Addition of wetting agent: | yes | yes | yes | no |
| rising time: | 1 min 55 s | ~30 min | 9 min | too fast to measure |
| setting time: | 2 min 15 s | >60 min | >60 min | too fast to measure |
| density: | 0.09 g/cm$^3$ | collapses | collapses | collapses |

One obtains only with Omyacarb 15 (B$_1$) and addition of wetting agent a homogeneously foamed, solid mass. Without fast reacting fine parts of the chalk powder (Component (B$_2$)) or if the proportion of the fine parts is too low (Component (B$_3$)) even with the addition of a wetting agent no stable foam is formed. Under the given experimental conditions it was not possible to obtain a stable and light foam without the addition of a wetting agent, since great collapsing bubbles were formed.

If one replaces wollastonite, which reacts beside of its mechanically strengthening properties also as slow reacting hardener, in component (B$_1$) by rock powder, (Type I), density (0.08 g/cm$^3$) and rising time remain approximately the same, the setting time increases to 3 min30 s.

These experiments also show the importance of the coordination of the rectivities of the single substances to obtain a solid foam with a low specific weight. Of great importance, however, are also the mixing conditions.

Influence of the mixing conditions: The stirring process is important for the obtained foam. Is the mixing time longer than the starting time, the (fine) part of the carbonate, which has alredy reacted, acts mainly as hardener, since the formed foam disintegrates again.

1. 50 g Component (A) with (B$_4$): 7 g Omyacarb 15 stired in 7 g water
2. 50 g Component (A) with (B$_5$): 6 g Omyacarb 15 and 0.4 g MgO (Type I) stirred in 6.4 g water
3. 50 g Component (A) with (B$_6$): 5 g Omyacarb 15 and 0.8 g MgO (Type I) stirred in 5.8 g water

|  | mixing time | rising time | setting time | density |
|---|---|---|---|---|
| 1. (B$_4$) | 7 s | 2 min 0 s | 2 min 20 s | 0.11 g/cm$^3$ |
| 2. (B$_5$) | 3 s | 2 min 0 s | 3 min 20 s | 0.08 g/cm$^3$ |
| 3. (B$_6$) | 3 s | 2 min 10 s | 5 min | 0.10 g/cm$^3$ |

Under the given experimental conditions a 7 s long mixed pure chalk-hardener-foaming agent system (Component (B$_4$)) results in a somewhat denser foam than if one replaces about 30% of the chalk by MgO (Type I) stirring only for 3 s.

I claim:

1. A process for producing an inorganic solid foamed mass which comprises mixing components (A) and (B) to form a foam and allowing said foam to set to form said solid foamed mass, wherein component (A) comprises an aqueous acidic phosphate solution of mainly polyvalent cations and phosphoric acid wherein between 0.8 to 1.75 protons of the phosphoric acid molecule of said phosphate are neutralized by the cations, and which also contains one or more fillers in the form of granules, platelets or powders dispersed therein, and having a viscosity at room temperature in the range of 2,000 mPa.s to 60,000 mPa.s; and wherein component (B) comprises an oxide, hydroxide or polyvalent salt of a weak acid as hardener, and a foaming agent, a carbonate which develops a gas under hardening conditions within 5 seconds to 10 minutes and in amount to neutralize the secondary phosphate groups to form a cross-linked structure upon setting for a period of 20 seconds to 10 minutes said cross-linked structure is relatively elastic with respect to a cross-linked foamed structure obtained when the teritary phosphate groups are neutralized.

2. Process according to claim 1, wherein the remaining acidic phosphate groups are neutralized by filler materials in one or both components.

3. Process according to claim 1, wherein the entire water content of the combined components is in the range of 15 to 45% by weight.

4. Process according to claim 1, wherein components (A) and (B) are mixed in a continuous process with a mixing time in the range between 0.1 s and 60 s.

5. Process according to claim 1 wherein component (B) is an aqueous suspension or paste having a solid content of 20 to 70 percent by weight.

6. Process according to claim 1, wherein component (A) contains as polyvalent cations aluminum, magnesium, calcium, barium, zinc, nickel, cobalt or manganese.

7. Process according to claim 1, wherein the hardener substances of component (B) contain a hydraulically hardening cement.

8. Process according to claim 1, wherein the foaming agent of component (B) is a carbonate or basic carbonate of a polyvalent metal, which is calcium, magnesium and/or zinc.

9. Process according to claim 1, wherein component (B) contains as foaming agent an alkali carbonate or ammonium hydrogen carbonate or ammonium carbonate.

10. Process according to claim 1, wherein at least one of the components contains a liquefier or an hydrophobic agent.

11. Process according to claim 1, wherein the hardening and drying of the foamed mass occurs under the influence of warm air, radiant heat, high frequency or micro waves.

12. A process according to claim 1, wherein component (A), component (B), or both components (A) and (B), contain a filler having a particle size less than 200$\mu$, and wherein said filler is Bauxite, quartz, aluminum oxide, feldspar, wollastonite, mullite or burned magnesite.

13. A process according to claim 1, wherein component (A), component (B), or both components (A) and (B), contain a filler having a structure in form of platelets, wherein the filler is ground mica or slate.

14. A process according to claim 1, wherein component (A), component (B), or both components (A) and (B), contain a filler having a fibrous structure which is cellulose fibers, aluminosilicate fibers, or glass fibers.

15. A process according to claim 1, wherein the hardener of component (B) is a salt of a weak acid which is a carbonate.

16. A process according to claim 1, wherein at least one of the components contains a wetting agent, a foam stabilizing agent, or a thixotropic agent, said agents being active in an acidic medium.

17. A process according to claim 1, wherein the foamed mass is formed as a moulded part and the components contain organic or inorganic fibers or fabrics as strengthening and reinforcing materials.

18. A process according to claim 1, wherein the foaming mass is applied to a surface immediately after continuous mixing of the components by use of compressed air.

19. A premix composition for producing an inorganic solid foamed mass by mixing components (A) and(B) to form a foam and allowing said foam to set to form said solid foam mass, wherein said premix contains components (A) and (B) separate from each other prior to mixing and component (A) comprises an aqueous acidic phosphate solution of mainly polyvalent cations and phosphoric acid wherein between 0.8 to 1.75 protons of the phosphoric acid molecule of said phosphate are neutralized by the cations, and which also contains one or more fillers in the form of granules, platelets or powders dispersed therein, and having a viscosity at room temperature in the range of 2,000 mPa.s to 60,000 mPa.s; and wherein component (B) comprises an oxide, hydroxide or polyvalent salt of a weak acid as hardener, and as a foaming agent, a carbonate which develops a gas under hardening conditions within 5 seconds to 10 minutes of mixing and in amount to neutralize the secondary phosphate groups of component (A) to form a cross-linked structure upon setting for a period of 20 seconds to 10 minutes said cross-linked structure is relatively elastic with respect to a cross-linked foamed structure obtained when the tertiary phosphate groups are neutralized.

20. The solid foam mass produced by the process of claim 1.

\* \* \* \* \*